Patented May 15, 1945

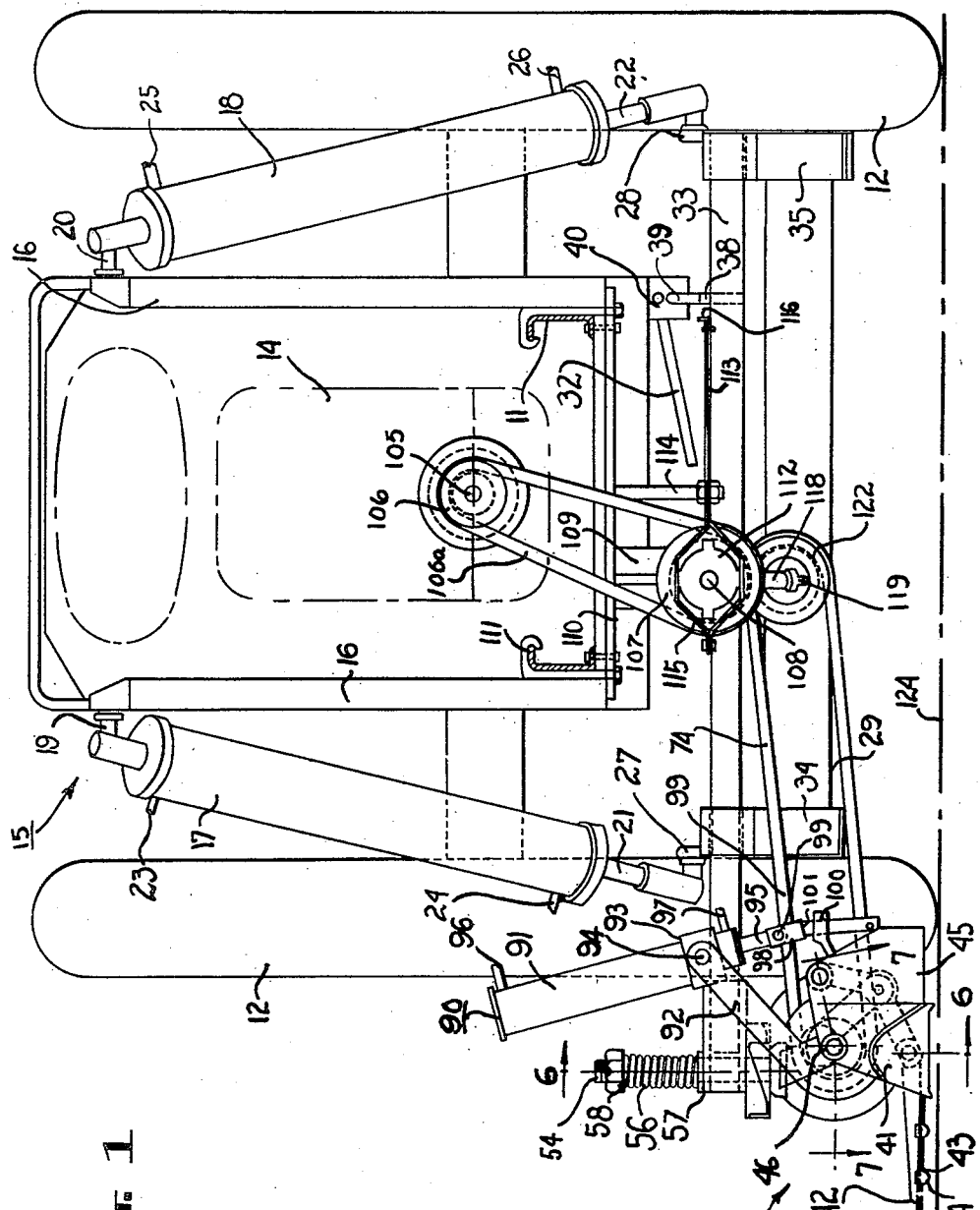

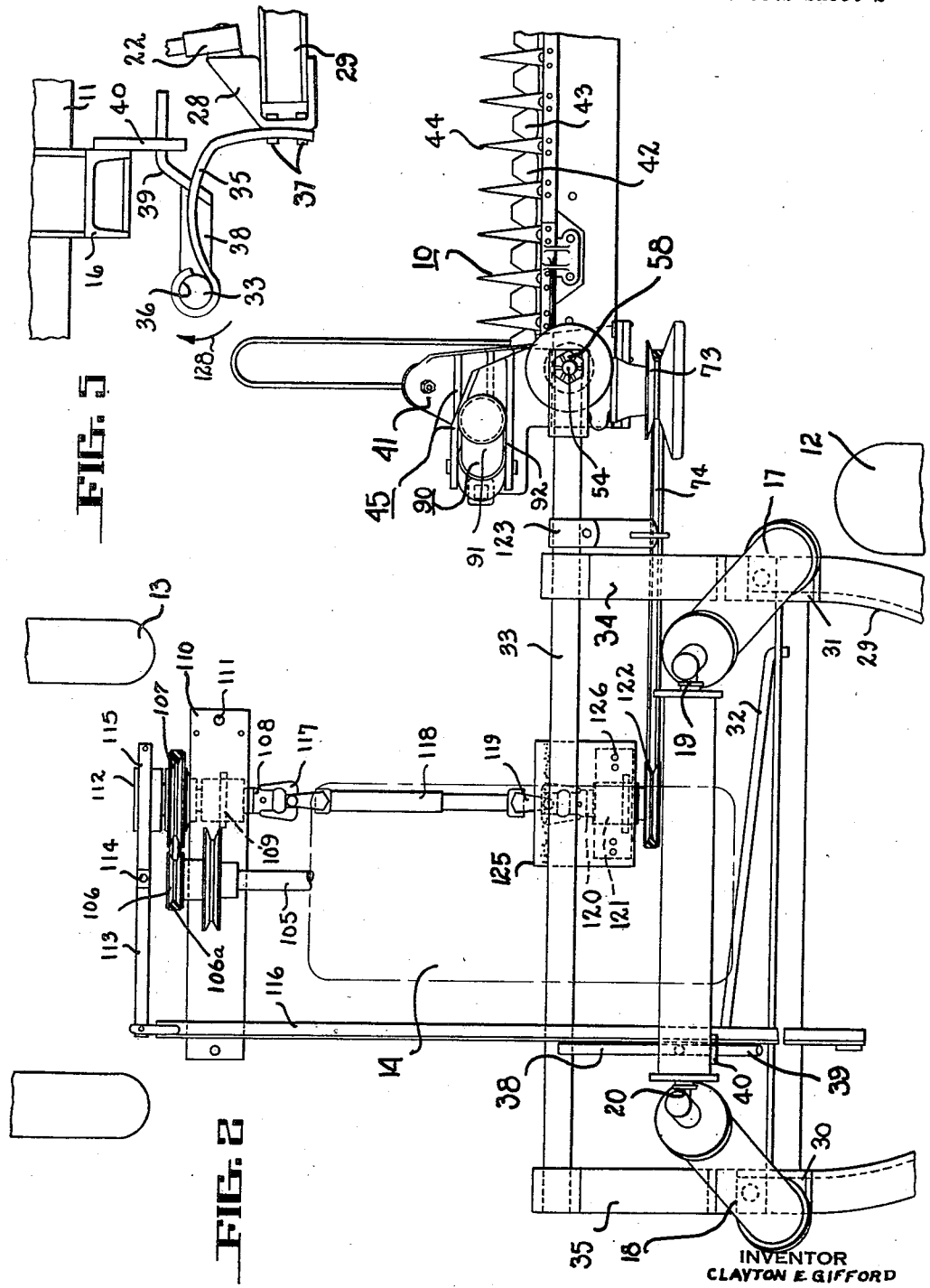

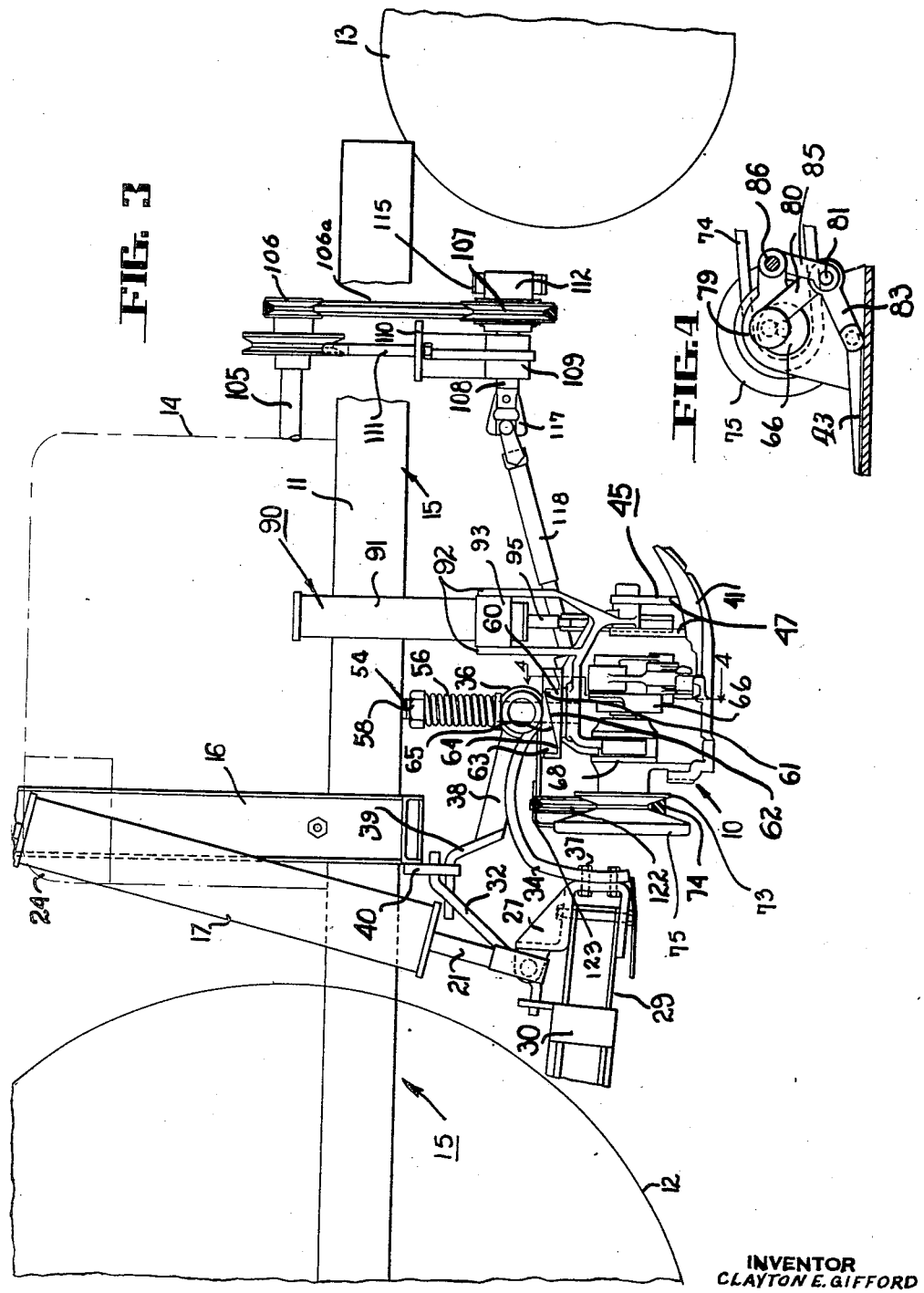

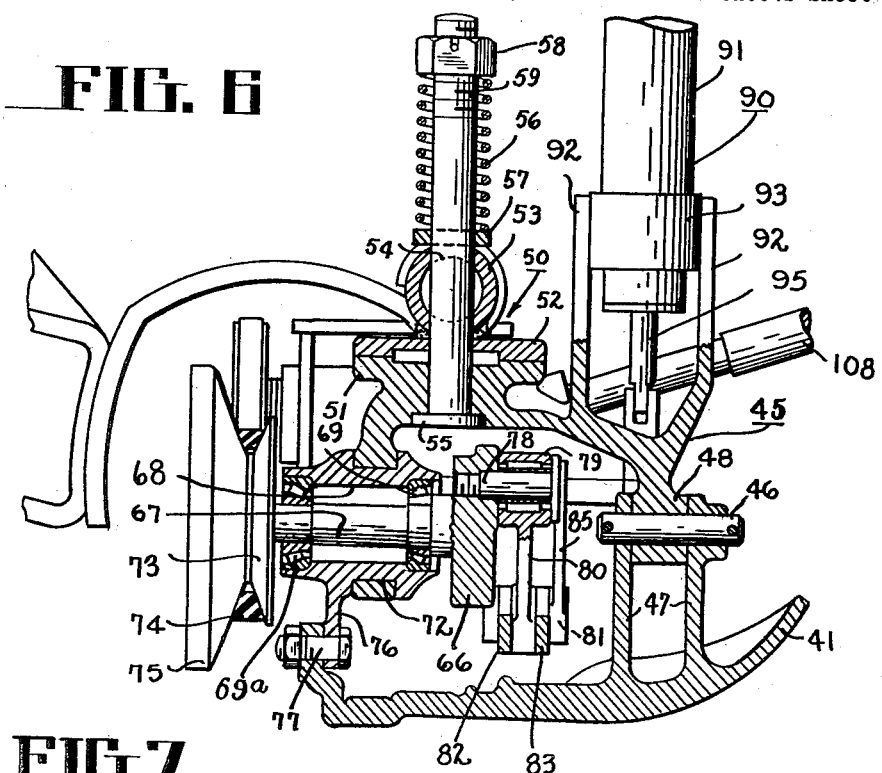

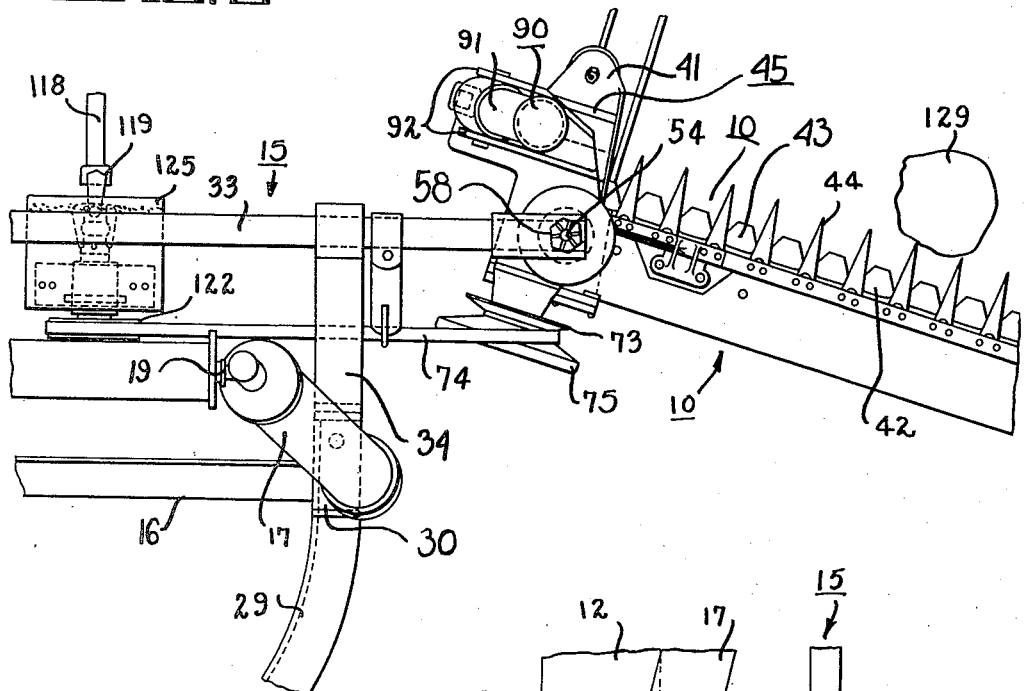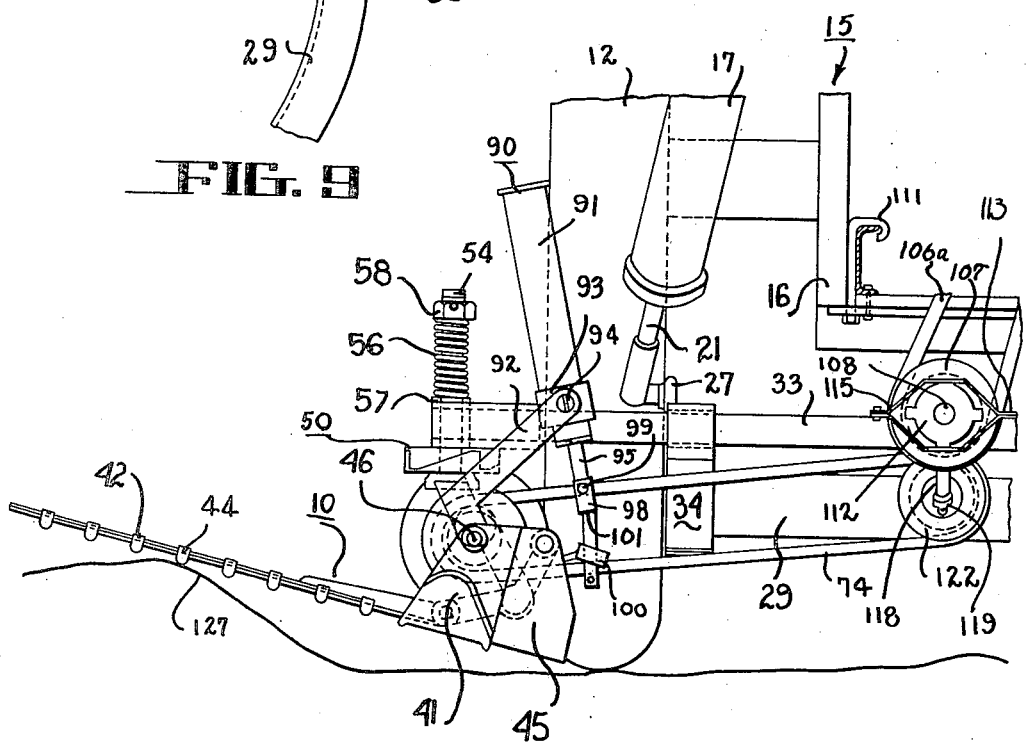

2,375,912

UNITED STATES PATENT OFFICE 2,375,912

MOWER

Clayton E. Gifford and Daniel S. Hoover, Marion, Ohio, assignors to The Huber Manufacturing Co., Marion, Ohio, a corporation of Ohio Application June 18, 1943, Serial No. 491,272

11 Claims. (Cl. 56—25)

This invention relates to mowing apparatus that is especially adapted to maintaining the edge of a highway in condition, but can be used for any mowing operation wherein it is desired to use a horizontal cutter bar that is adapted to extend beyond the chassis of the machine carrying the mowing apparatus. In this invention the mowing apparatus is constructed and arranged as a piece of auxiliary equipment that can be attached to a road grader, tractor or maintainer, for converting the grading machine or tractor into a mowing machine whereby the versatility of a single machine is greatly increased It is to be understood, of course, that the apparatus may be constructed as an integral part of a machine and be used solely as a mower if such an arrangement is desired.

An object of the invention is to provide a mowing apparatus that is constructed and arranged in a manner that it can be attached to a grading machine and to the same supporting apparatus on the machine that carries the grader blade whereby the horizontal position of the mowing apparatus relative to the ground, and its spacing therefrom can be regulated by the same apparatus on the machine that normally controls the position of the grader blade and its angular position relative to the ground.

Another object of the invention is to provide a mowing apparatus that is constructed and arranged in accordance with the foregoing object wherein the mechanism for regulating the position of the mowing apparatus relative to the ground also provides means for regulating the pitch of the cutter bar and guards therefor relative to the ground or the machine.

Another object of the invention is to provide a mowing apparatus that is constructed and arranged in a manner that the cutter bar can be raised or lowered from a horizontal position without interfering with the driving mechanism for operating the sickle whereby the cutter bar can be moved to any position above or below horizontal without interfering with the operation of the sickle for cutting weeds, grass and the like, from either hillsides or in ditches.

Another object of the invention is to provide a mowing apparatus that is constructed and arranged in a manner that the cutter bar is pivotally mounted on an axis that is co-axial with the axis of the driving mechanism for the sickle to permit the cutter bar to be raised and lowered from a horizontal position without stopping the operation of the sickle.

Another object of the invention is to provide a mowing apparatus that is constructed and arranged in a manner that the cutter bar can swing in the opposite direction of movement from the direction of motion of the machine so that if the cutter bar strikes a large object that it can swing in a manner to clear the object and will automatically return to its normal cutting position after the object has been passed by the machine.

It is another object of the invention to provide a mowing apparatus that is constructed and arranged in accordance with the foregoing object whereby the movement of the cutter bar referred to in the foregoing object is resisted with a predetermined resistance before the apparatus for regulating this movement will release the cutter bar to permit its motion so that the cutter bar is normally urged by the apparatus into its cutting position.

It is another object of the invention to provide a mowing apparatus having a clutch mechanism for regulating the movement of the cutting bar referred to in the foregoing object which automatically returns the cutter bar to its normal position after the obstruction has been passed by the bar.

It is still another object of the invention to provide a mowing apparatus that is constructed and arranged in a manner that the cutter bar will rotate about a vertical axis if it should strike a stationary object during the mowing operation, and wherein the driving mechanism for the sickle will be automatically disconnected to stop the operation of the sickle until the cutter bar has swung around the object and returned to normal cutting position, wherein the driving mechanism for the sickle will be automatically re-engaged for driving the same.

It is another object of the invention to provide a mowing apparatus that is constructed and arranged in a manner that the supporting member therefor provides the means for controlling the pitch of the guards for the cutter.

Another object of the invention is to provide a mowing apparatus that has control mechanism associated therewith for regulating the position of the mower relative to the ground, for controlling the position of the cutter bar either up or down from a horizontal position and for regulating the pitch of the guards.

It is another object of the invention to provide a mowing apparatus that is constructed and arranged as auxiliary equipment for attaching to a machine to convert the machine into a mower wherein all of the features of the foregoing objects are incorporated in the mowing attachment.

It is still another object of the invention to provide an improved power take-off drive for a mowing apparatus that may be used as an attachment on a machine to convert the machine for mowing operations.

Further objects and advantages of the invention will become apparent from the drawings and the following description.

In the drawings:

Figure 1 is a front elevational view of the mowing apparatus of this invention as supported upon a tractor type vehicle, certain portions of the vehicle being omitted to more clearly illustrate the invention.

Figure 2 is a top plan view of the mowing apparatus of the invention as supported upon a tractor type vehicle, certain portions of the vehicle being omitted in the interest of clearly illustrating the invention and the means for supporting the same upon the vehicle.

Figure 3 is a side elevational view of the mowing apparatus of this invention as supported upon a tractor type vehicle, certain portions of the vehicle being omitted in the interest of clarity of showing of the invention.

Figure 4 is a cross sectional view taken along line 4—4 of Figure 3 to illustrate the mechanism for driving the sickle.

Figure 5 is a side elevational view taken from the opposite side of the machine as that shown in Figure 3 showing the mechanism for controlling the pitch of the guards of the mowing apparatus.

Figure 6 is a vertical cross sectional view taken along line 6—6 of Figure 1.

Figure 7 is a horizontal cross sectional view taken along line 7—7 of Figure 1.

Figure 8 is a top plan view of the mowing apparatus showing the manner in which it is pivoted about a vertical axis when the cutter bar meets an obstruction.

Figure 9 is a front elevational view of the mowing apparatus showing the manner in which it is pivoted about a horizontal axis when the cutter bar meets an obstruction that causes the same to move upwardly or downwardly from a horizontal position.

Figure 10 is a front elevational view of the portion of the mowing apparatus showing its position as rotated about a horizontal axis when the cutter bar is below the horizontal.

In this invention the mowing apparatus 10 is adapted to be supported on a vehicle 15 which in this instance is a tractor type vehicle. The vehicle 15 is especially adapted for use as a road grader unit, but in this invention the grader blade has been removed from the vehicle 15 and the mowing apparatus 10 has been placed upon the mechanism that normally supports the grader blade. Therefore, the mechanism that normally controls the movement of the grader blade to position the same upon the road and to provide the desired inclination of the blade will also control the positioning of the mowing apparatus 10 relative to the road. In addition, this same mechanism can provide means for controlling the pitch of the guards on the mower in a manner that will be hereinafter described. While the mowing apparatus 10 disclosed in this invention is shown and described as an auxiliary mechanism that can be attached to a vehicle for converting the same into a mowing machine, it is to be understood that the apparatus can be built into any machine as an integral part thereof so that it will perform only as a mowing machine if desired.

The tractor type vehicle 15, shown in this invention, is illustrated somewhat diagrammatically but the essential structural elements are shown for supporting the various mechanisms of the mowing apparatus 10. The vehicle consists of a chassis 11 that is supported upon rear wheels 12 and front wheels 13, an engine 14 being carried by the chassis 11 in the usual manner.

The chassis 11 carries a U-shaped upright channel member 16 that supports a pair of hydraulic cylinders 17 and 18, these cylinders being pivoted to the channel member 16 near the upper end thereof by means of the pivots 19 and 20 respectively. The hydraulic cylinders 17 and 18 are provided with pistons therein in the usual manner that are connected with plungers 21 and 22 extending from the cylinders 17 and 18 respectively. The cylinder 17 is provided with fluid connections 23 and 24 while the cylinder 18 is provided with the fluid connections 25 and 26 which supply liquid to opposite ends of the hydraulic cylinders 17 and 18 for operating the pistons in the cylinders to produce double acting hydraulic motors in the conventional manner. The liquid supplied to the cylinders 17 and 18 can be obtained from any suitable pressure source provided on the vehicle 15.

The plungers 21 and 22 extending from the hydraulic cylinders 17 and 18, respectively, are connected to the brackets 27 and 28 secured to the opposite ends of a semi-cylindrical channel member 29 that is guided in box members 30 and 31, whereby this member 29 can be rotated in a horizontal plane to change the angular position of a mechanism carried thereby relative to the frame of the vehicle 15. Suitable means is provided at the rear portion of the channel member 29 for supporting the same from the frame of the vehicle 15 and yet permit rotation of the member 29 within this supporting means. The frame member 29 is also adapted to be rotated about a horizontal axis by means of the plungers 21 and 22 extending from the hydraulic cylinders 17 and 18. Simultaneous extension of the plungers 21 and 22 causes the open end of the member 29 to move downwardly so that a device carried on the end of the member will be moved closer to the ground, whereas if one of the plungers is extended and the other retracted, the member 29 will be rotated about a horizontal axis to which the angular position of a member carried thereon relative to the frame of the vehicle. A suitable drag link 32 is provided between the channel member 29 and the frame of the vehicle 15 to prevent transverse movement of the member 29 relative to the frame of the vehicle.

The apparatus thus far described is a vehicle that has previously been adapted for use as a road grading machine, a suitable scraper blade being secured to the bracket members 27 and 28 for conditioning or grading the road, the scraper blade being moved up or down or being positioned angularly relative to the frame of the vehicle by means of the operation of the plungers 21 and 22.

In order to support the mowing apparatus upon the vehicle thus far described, there is provided a bar 33 extending transversely of the vehicle 15. A pair of brackets 34 and 35 each having one end thereof provided with an eye 36 that surrounds the bar 33, the opposite end of each of the brackets 34 and 35 being secured to the brackets 27 and 28 respectively, by means of bolts 37. Near one end of the bar 33 there is provided an extending arm 38 that is suitably secured to the bar 33, such as by means of welding the same. This arm 38 carries a rod 39 that extends through an opening provided in the plate 40 that extends downwardly from the U-shaped channel member 16 secured to the chassis 11 of the vehicle. The purpose of this arm 38 and rod 39 is to change the pitch of the guards of the mowing apparatus in a manner that will be hereinafter described.

A mowing apparatus referring more particularly to Figures 6 and 7, consists of a shoe 41 that has the cutter bar 42 extending therefrom, a suitable sickle 43 being provided upon the cutter bar 42, and the cutter bar 42 being provided with guards 44.

The shoe 41, and the associated cutter bar 42, are pivotally mounted upon a frame member 45 by means of a pivot pin 46 that extends through a yoke 47 provided on the shoe 41 and an arm 48 provided on the frame 45.

The frame 45 carries the lower segment 51 of a clutch 50, the upper segment 52 of the clutch 50 being secured to a sleeve 53 that is secured to the bar 33 in a manner that it is stationary therewith such as by welding. A pivot pin 54 extends upwardly through the frame 45, the clutch 50 and the sleeve 53, and is limited in its upward movement by means of a head 55 provided on the lower edge of the pivot pin 54. The upper end of the pivot pin 54 is provided with a compression spring 56 surrounding the same that has one end thereof engaging a washer 57 supported by the sleeve 53 and the opposite end engaging a nut 58 that is carried upon the threaded end 59 of the pivot pin 54, the nut 58 providing means to adjust the degree of compression of the spring 56 which thereby holds the clutch members 51 and 52 in engagement with another.

The pivot pin 54 provides a vertical axis of rotation for the frame 45 and thus the cutter bar 42, while the pivot pin 46 provides a horizontal axis of rotation for the cutter bar 42 for reasons of operation hereinafter described.

The clutch member 50 has the lower segment 51 thereof provided with a plurality of teeth 60. These teeth 60 each have a flat portion 61 provided on the upper end thereof and an angularly inclined wall 62. The upper segment 52 of the clutch 50 is provided with similarly constructed teeth 63 that are inverted relative to the teeth 60 and have a flat portion 64 thereon and an angularly inclined wall 65. These teeth 60 and 63 are adapted to co-operate with one another whereby they are in intermeshing relationship so that the cutter bar 42 of the mowing apparatus 10 will be held transversely of the vehicle 15 and at substantially a right angle thereto. This position of the cutter bar is the normal position of the same during a working operation. The spring 56 provides the necessary force to hold the lower clutch member 51 in engagement with the upper clutch member 52 so that the teeth 60 and 63 are retained in intermeshing relationship and in full engagement with one another as shown in Figure 3.

The mechanism for driving the sickle 70 of the mowing apparatus consists of an eccentric 66 which is secured to or is a part of the shaft 67 that is supported in the bearing support member 68 by means of the anti-friction bearings 69 and 69a, the bearing support member being carried in the opening 72 in the frame 45. The end of the shaft 67 that extends beyond the bearing 69a carries a drive pulley 73 for receiving a driving belt 74, the pulley 73 having an enlarged flange face 75 for preventing removal of the belt 74 and for a purpose that will be hereinafter described.

The axis of the shaft 67 is in coaxial alignment with the pivot pin 46 upon which the cutter bar 42 is rotated upon a horizontal axis. Since the bearing support member 68 is secured to the shoe 41 by means of the flange 76 and the bolt 77 it will be apparent that the shoe 41 and the co-operating cutting bar 42 can rotate upon a horizontal axis consisting of the pivot pin 46 and the bearing support member 68 without interfering with the operation of the eccentric 66 or any mechanism driven thereby.

The eccentric 66 carries a pin 78 that is eccentric to the axis of the eccentric 66 that supports one end 79 of a drive link 80. The opposite end of the drive link 80 is connected to a shaft 81 that carries a pair of drive links 82 and 83 on opposite sides of the drive link 80, these links 82 and 83 being secured to the sickle 43. The shaft 81 also supports a pair of links 84 and 85, these links being positioned outside of the links 82 and 83 and having their opposite ends supported upon a shaft 86 that is secured between the brackets 87 and 88 extending from the shoe 41. This linkage will be more apparent in Figures 4 and 7 and provides the means whereby the link 80 can reciprocate the link 83 for driving the sickle 43.

In order to provide means for raising and lowering the cutter bar 42 relative to a horizontal position or for placing the cutter bar in a vertical position when driving the vehicle from one place to another, there is provided a hydraulic motor 90 that consists of a cylinder 91 mounted upon a pair of arms 92 that extend upwardly from the frame 45, the cylinder being secured to a sleeve 93 which in turn is pivotally mounted to the arms 92 by means of a pivot pin 94 extending through each of the arms 92 into the sleeve 93. A piston is provided within the sleeve 91 and has a plunger 95 extending from the cylinder, the piston within the cylinder 91 being operated by means of liquid passing to or from the liquid lines 96 and 97. The hydraulic motor 90 is thus of the double acting type. A link 98 is pivotally mounted upon the end of the plunger 95 by means of the pivot pin 99 and passes through a boss 100 extending from the frame 45. The link 98 is provided with a shoulder 101 that is adapted to engage a seat in the boss 100 whereby the frame 45 will be rotated about the axis of the pivot pin 46 and the bearing support 68 when the shoulder 101 engages the seat in the boss 100 upon extension of the plunger 95 from the cylinder 91.

In order to drive the mowing apparatus of this invention a drive shaft 105 extends from the front end of the engine 14 and carries a pulley 106. A belt 106a extends between the pulley 106 and a pulley 107 carried upon a shaft 108 that is supported in a bearing support 109 secured to the plate 110 that is in turn secured to the chassis 11 of the vehicle 15 by means of the hooked rods 111. A suitable clutch mechanism 112 is provided between the pulley 107 and the drive shaft 108 for controlling the driving connection between the pulley 107 and the drive shaft 108.

The clutch 112 is actuated by means of a bar 113 that is pivotally mounted upon the rod 114 and has a yoke 115 on one end thereof to engage the clutch 112. The bar 113 is in turn connected to a bar or rod 116 that extends longitudinally of the vehicle 15 toward the driver's seat position so that the driver can actuate the bar 116 and thus actuate the clutch 112 to control the drive of the mowing apparatus 10.

The shaft 108 carries a universal joint 117 that is connected to a spline shaft 118 having a universal joint 119 on the opposite end thereof. The universal joint 119 is connected to a shaft 120 supported in a bearing 121. The opposite end of the shaft 120 supports a pulley 122 that is engaged by the belt 74 that engages the pulley 73 provided on the mowing apparatus 10 for driving the same. A belt guard 123 is carried upon the support rod 33 for preventing dislocation of the belt during operation of the device.

The bearing 121 is secured to the plate 125 by any suitable means such as the bolts 126, the plate 125 being rigidly secured to the support rod 33 such as by welding whereby the pulleys 122 and 73 will be maintained in alignment to prevent misalignment of the belt 74 when the support rod 33 is rotated to adjust the pitch of the guards 44 in a manner to be hereinafter described.

In the normal operation of the mowing apparatus 10 of this invention when the mowing operation is to be performed upon relatively level ground, the cutter bar 42 of the mowing apparatus is disposed in a horizontal position, as shown in Figures 1 and 3. The position of the cutter bar 42 relative to the ground, that is the height above the ground level 124 is controlled by means of the hydraulic cylinder 17 and the plunger 21. Liquid that is admitted to the cylinder 17 through the line 24 will move the plunger 21 upwardly to thereby move the left-hand side of the frame member 29 upwardly, as viewed in Figure 1, to thereby position the cutter bar 42 farther away from the ground. Of course, if liquid is admitted to the hydraulic cylinder 17 through the line 23 the reverse movement of the cutter bar is obtained to thereby control the height of cut that is to be made by the mowing apparatus.

It is to be understood, of course, that the outer end of the cutter bar 42 is provided with the usual runner that engages the ground so that the cutter bar will float over the ground to take care of slight irregularities that would occur in what is normally termed level ground. The mowing apparatus floats about its pivot pin 46 and the bearing support 68 during this pivotal floating operation. The hydraulic motor 90 has the plunger 95 thereof retracted sufficiently to remove the shoulder 101 on the link 98 from engagement with the seat thereof in the boss 100 to permit this floating operation so that the cutter bar could move slightly below horizontal and above horizontal to take care of ground irregularities.

From the foregoing description of the normal operation of the mowing apparatus 10 it will become apparent if the cutter bar should strike an abnormally large rise in the ground, or some other obstruction that is considerably above the normal level of the ground, such as the ground obstruction 127, illustrated in Figure 9, that the guards 44 will strike the rise 127 causing the frame 48 of the mowing apparatus to pivot about the pivot pin 46 and the axis of the bearing support 68. This vertical movement of the cutter bar in the normal operation thereof in climbing over rises and dropping into valleys will not disturb the drive apparatus for the sickle heretofore described because the axis of rotation of the frame 45 is the same as the driving axis for the pulley 73.

The plunger 95 of the hydraulic motor 91 can be retracted sufficiently to permit the cutter bar 42 to drop below horizontal as much as 45° so that receding hillsides can be mowed, and the weeds and grass cut to the same height as though the cutter bar was working in a horizontal position. Such operation of the device is illustrated in Figure 10. Also, when it is desired to mow an ascending hillside the hydraulic motor 90 can be operated to extend the plunger 95 until the shoulder 101 on the link 98 engages its seat in the boss 100 to rotate the frame 45 around its pivotal axis consisting of the pin 46 and the bearing support 68. The cutter bar 42 can thus be positioned at any angle above the horizontal without interfering with the operation of the mowing apparatus so that the grass and weeds on a hillside can be cut just as low to the ground as though the device was working in a horizontal position. In fact, the plunger 95 of the hydraulic motor 90 can be extended sufficiently far to position the cutter bar in a substantially vertical position without interfering with the operation of the mowing apparatus. The vertical position, however, is the one in which the cutter bar is normally carried when moving the road machine from one location to another.

In order to prevent the guards 44 from digging into slight rises in the ground during the forward movement of the mowing apparatus it is desirable that they have an upwardly inclined pitch imparted thereto toward the forward end of the guard. The pitch control device for the guards 44 consists of the plunger 22 and the hydraulic cylinder 18 on the right-hand side of the machine as illustrated in Figure 1. It will be noted in Figure 3 that the arm 38 extending from the support rod 33 is disposed at a downwardly inclined angle, and that the guards are disposed substantially horizontal. In order to pitch the guards upwardly at their forward ends the plunger 22 is retracted into the cylinder 18 when fluid is admitted to the cylinder 18 through the fluid line 26. When the plunger 22 moves upwardly carrying the right-hand side of the frame 29, as viewed in Figure 1, the arm 38 attached to the support rod 33 will be pivoted about a center of rotation provided by the rod 39 attached to the arm 38 and the bracket 40, the rod 39 extending through an opening in the bracket 40. This upward movement of the arm 38 and rotation thereof about its axis of rotation will rotate the support rod 33 in the direction indicated by the arrow 128 shown on Figure 5. The result of rotation of the rod 33 is to impart an upward pitch to the guards 44 of the mowing apparatus as illustrated in Figure 5.

Many times there are large obstructions along the side of the road that are engaged by the guards 44 on the mowing apparatus, these obstructions being of such a nature that the cutter bar does not have a tendency to ride over them. If these obstructions should be hidden in the weeds considerable damage can result to the mowing apparatus as a result of this sudden stopping of the forward movement of the mowing apparatus without simultaneously stopping the vehicle, so that if the driver of the vehicle is not extremely cautious, the mowing apparatus will probably be broken.

To prevent such damage of the mowing apparatus of this invention, the vertical pivot pin 54 provides means upon which the frame 45 can be rotated about a vertical axis. As illustrated in Figure 8 the guards 44 of the mowing apparatus 10 are shown as engaging a tree stump 129. When the guards engage such an obstruction as the tree stump 129, the cutter bar 42 will be rotated in an opposite direction to the forward movement of the apparatus, namely, rearwardly, about the pivot pin 54. The degree of rotation is relatively unlimited so that the cutter bar 42 can clear the obstruction 129 without causing any damage to the mowing apparatus. The only limitation as to the degree of rotation that can be provided for the mowing apparatus about the pivot 54 is the length of the cam surface between the teeth 60 and 63 provided on the lower and upper members 51 and 52 of the clutch 50. However, these cam surfaces can be made as long as desired to permit as much as 90° rotation of the cutter bar about the vertical pivotal axis 54 if desired.

As previously described the teeth 60 and 63 of the clutch 50 have flat surfaces 61 and 64 thereon, respectively. These flat surfaces on the teeth 60 and 63 provide a certain initial resistance to rotation of the lower clutch member 51 relative to the upper clutch member 52 so that the cutter bar 42 would have to overcome an initial resistance to rotation before it would rotate about the vertical axis provided by the pin 54. This is to prevent the cutter bar from swinging rearwardly too easily and thus producing a skipping or hunting action of the cutter bar. Also, as previously described the cam surfaces 62 and 65 on the teeth 60 and 63, respectively, of the clutch 50 provide means whereby the lower clutch member 51 is returned to its normal position relative to the upper clutch member 52 with the teeth 60 and 63 in full engagement with one another whenever the cutter bar 42 has passed around such an obstruction as the tree stump 129. This is automatically accomplished because the compression spring 56 continuously urges the cam surface on the teeth 60 to ride upon the cam surface of the teeth 63 and return the same to the position as shown in Figure 3 for positioning the cutter bar substantially at right angle to the chassis 11 of the vehicle.

When the cutter bar 42 strikes an obstruction such as the tree stump 129 and swings rearwardly, as shown in Figure 8, the driving means for the sickle of the mowing apparatus is automatically disconnected and will not be re-engaged until the cutter bar 42 has returned to its normal position. As illustrated in Figure 8 it will be apparent that when the cutter bar 42 swings rearwardly about the axis of the vertical pivot pin 54 that the pulley 73 will swing toward the vehicle 15 thereby shortening the distance between the pulley 73 and the pulley 122 so that the belt 74 will no longer tend to drive the pulley 73 because it is now running loose between the pulleys 73 and 122. The large flanged face 75 provided on the pulley 73 prevents the belt 74 from slipping off the pulley 73 when the cutter bar swings rearwardly. It will be apparent from the disclosure in Figure 8 that the belt 74 will not drive the pulley 73 until the cutter bar 42 has returned to its normal position.

While the form of the apparatus disclosed and described herein constitutes a preferred form, yet it is to be understood that the mechanical details of the apparatus can be altered without departing from the spirit of the invention, and that all such modifications as fall within the scope of the appended claims are intended to be included herein.

Having thus fully described our invention what we claim as new and desire to secure by Letters Patent is:

1. In a mowing apparatus, a support member, a frame member, mowing means carried by said frame member, means supporting said frame member upon said support member on a substantially vertical axis of rotation including cam means coincident with the axis of rotation, and resiliently acting means operably acting upon said cam means for holding said frame member in a selected position for positioning the mowing means in position for a normal mowing operation and for permitting rotation of said frame member about the means forming the axis of rotation therefor in a direction opposite to the direction of movement of the mowing means when performing a mowing operation, said resiliently acting means and said cam means automatically returning said frame to its selected position.

2. In a mowing apparatus, the combination of, a mowing mechanism having driving means for the same, vertically disposed pivot means supporting said mowing mechanism and positioned normal to the axis of said driving means, resiliently acting means co-operating with said pivot means for positioning said mowing mechanism in a selected position, flexible means connecting said driving means with a source of power positioned a predetermined distance from said driving means, said mowing mechanism being mounted on said pivot means for horizontal rotation to reduce the distance between said driving means and the source of power for the same is reduced to render the means connecting said driving means with the source of power ineffective for driving said driving means.

3. In a mowing apparatus, the combination of, a mowing mechanism having driving means for the same, vertically disposed pivot means supporting said mowing mechanism and positioned normal to the axis of said driving means, resiliently acting means co-operating with said pivot means for positioning said mowing mechanism in a selected position, belt means connecting said driving means with a source of power positioned a predetermined distance from said driving means, said mowing mechanism being mounted for horizontal rotation upon said pivot means to reduce the distance between said driving means and the source of power for the same is reduced to render said belt means ineffective for driving said driving means.

4. A mowing apparatus including in combination, a mowing mechanism having driving means for the same, vertically disposed pivot means for said mowing mechanism about which said mechanism is rotatable, toothed clutch means in axial alignment with said pivot means, resiliently acting means for releasably holding the teeth of said clutch means in engagement with one another to position said mowing means in a selected position and to obtain horizontal rotation of the mowing means, a source of power, flexible means connecting said source of power with said driving means, said mowing mechanism being horizontally rotatable upon said pivot means to move said driving means relatively to said source of power to decrease the distance therebetween and render said flexible means ineffective.

5. A mowing apparatus including in combination, a support member consisting of a rod, means supporting opposite ends of said rod adapted to be connected to a vehicle, vertically disposed pivot means carried on one end of said rod, a frame member carried by said pivot means for rotation thereon, a toothed clutch member positioned between said support rod and said frame member, resiliently acting means for retaining the teeth of said clutch member in engagement to position said frame member in a selected position relatively to said support rod, and a mowing mechanism having bearing means for driving means carried thereby to drive the sickle of said mowing means, pivot means in axial alignment with said bearing means, said pivot means and said bearing means being carried by said frame to support said mowing means upon a horizontal axis of rotation, whereby said mowing means can move vertically without interfering with the operation of said driving means.

6. A mowing apparatus including in combination, a support member consisting of a rod, means supporting opposite ends of said rod adapted to be connected to a vehicle, vertically disposed pivot means carried on one end of said rod, a frame member carried by said pivot means for rotation thereon, a toothed clutch member positioned between said support rod and said frame member, resiliently acting means for retaining the teeth of said clutch member in engagement to position said frame member in a selected position relatively to said support rod, a mowing mechanism having bearing means for driving means carried thereby to drive the sickle of said mowing means, pivot means in axial alignment with said bearing means, said pivot means and said bearing means being carried by said frame to support said mowing means upon a horizontal axis of rotation, whereby said mowing means can move vertically without interfering with the operation of said driving means, and power means carried by said frame for rotating said mowing means about said pivot means and said bearing means as the horizontal axis of rotation therefor to selectively position said mowing means upwardly or downwardly relatively to a horizontal position.

7. A mowing machine including means for supporting a mowing mechanism consisting of a support member extending transversely of the machine, power means engaging opposite ends of said support means for independently moving the ends of the support means in an upward or downward direction, means carried by said support means for engaging a stationary element of the machine, and a mowing mechanism supported upon one end of said support member, whereby the power means engaging one end of said support member will move the mowing mechanism to vertically adjust the position of the same and the power means engaging the opposite end of said support means will rotate said support means to adjust the angular position of the mowing mechanism relatively to a horizontal plane.

8. A mowing machine including a support member consisting of a bar extending transversely of the machine, power means supporting opposite ends of said bar, pulley means carried by said bar, means extending from said bar into engagement with a stationary element of the machine, and a mowing mechanism supported upon one end of said bar having pulley means thereon, belt means extending between the aforesaid pulley means, whereby movement of one of said power means will cause rotation of said bar to adjust the angular position of the mowing mechanism relatively to a horizontal plane, said belt means remaining in continuous alignment between said pulley means irrespective of rotation of said support bar.

9. A mowing machine including in combination, support means consisting of a bar extending transversely of the machine, power means supporting opposite ends of said bar for moving the same in an upward or downward direction independently, means extending from said bar for engaging a stationary element of the machine, whereby the bar is rotated upon movement of one of said power means, and a mowing mechanism supported upon one end of said bar consisting of, a vertically disposed pivot means carried by said bar, a frame member carried by said pivot means for rotation thereon, toothed clutch means disposed between said power and said frame, resiliently acting means for retaining the teeth of said clutch member in engagement to selectively position said frame relatively to said bar, a mowing means having bearing means supported in said frame means for driving said sickle, pivot means in axial alignment with said bearing means, said pivot means and said bearing means supporting said mowing means upon a horizontal axis of rotation to permit horizontal movement of said mowing means, and means connecting said driving means to a source of power on the machine.

10. A mowing mechanism including in combination, a support member, vertically positioned pivot means carried by said support member, a mowing mechanism rotatably carried upon said pivot means, toothed clutch means positioned between said support member and said mowing mechanism, resiliently acting means for retaining the teeth of said clutch member in engagement with one another to selectively position said mowing mechanism relatively to said support member, said clutch teeth having co-operating cam surfaces thereon to prevent rotation of said mowing mechanism upon said pivot means until the resistance of said cam means has been overcome and in cooperation with said resiliently acting means to automatically return said mowing mechanism to its selected position relatively to said support member whenever it has been rotated out of such position.

11. In a mowing apparatus, a support member, a frame member, mowing means carried by said frame member, driving means for said mowing means supported by said frame member, means supporting said frame member upon said support member and providing a vertical axis of rotation therefor, a source of power, releasable means connecting said driving means with said source of power under normal operation of the mowing means and operable to release the said source of power from said driving means when said frame member is rotated horizontally about its vertical axis.

CLAYTON E. GIFFORD.
DANIEL S. HOOVER.